United States Patent [19]

Mounts et al.

[11] 4,185,302

[45] Jan. 22, 1980

[54] RUN LENGTH ENCODING OF FACSIMILE SIGNALS

[75] Inventors: Frank W. Mounts, Colts Neck; Arun N. Netravali, Matawan; Kenneth A. Walsh, Atlantic Highlands, all of N.J.

[73] Assignee: Bell Telephone Laboratories, Incorporated, Murray Hill, N.J.

[21] Appl. No.: 926,330

[22] Filed: Jul. 20, 1978

[51] Int. Cl.² ............................................. H04N 1/00
[52] U.S. Cl. ................................................. 358/261
[58] Field of Search ................................ 358/260, 261

[56] References Cited

U.S. PATENT DOCUMENTS

| 4,060,834 | 11/1977 | Mounts | 358/261 |
|---|---|---|---|
| 4,086,620 | 4/1978 | Bowen | 358/261 |
| 4,101,934 | 7/1978 | Fukuoka | 358/261 |

OTHER PUBLICATIONS

Huffman, "A Method for the Construction of Minimum Redundancy Codes", *Proceedings, of I.R.E.*, vol. 40, Sep. 1952, pp. 1098–1101.

*Primary Examiner*—Howard W. Britton
*Attorney, Agent, or Firm*—Barry H. Freedman

[57] ABSTRACT

A facsimile signal encoding technique reduces the amount of information needed to represent a picture by (a) generating an error signal (on line 1120) which indicates whether an intensity value prediction corresponds to the true intensity value, (b) generating a reference signal (on line 1005) indicating whether the confidence in each prediction is high or low, (c) reordering the error signal values (logic 1010) into high and low confidence groups in accordance with the reference signal, and (d) assigning code words (encoder 1016) to represent the run lengths of the reordered data. Advantageously, different code dictionaries are selected (line 1019) for code assignment in each of the groups, each dictionary being tailored to the type of runs expected in each group. Also, code words for certain runs may be dropped, and the lengths of other runs may be combined (by logic 1015) before run length coding, again increasing encoder efficiency. A receiver (FIGS. 16–18) for decoding the run lengths is described.

31 Claims, 19 Drawing Figures

FIG. 1
| ROW | SIGNAL | PEL NUMBER | | | | | | | |
|---|---|---|---|---|---|---|---|---|---|
| | | 1 | 2 | 3 | 4 | 5 | 6 | 7 | 8 |
| 1 | PREVIOUS LINE | 1 | 1 | 0$^A$ | 1$^B$ | 1$^C$ | 0 | 1 | 1 |
| 2 | CURRENT LINE | 1 | 0 | 0$^D$ | 1$^X$ | 0 | 0 | 0 | 1 |
| 3 | PREDICTION | 1 | 1 | 0 | 1 | 1 | 0 | 1 | 0 |
| 4 | PROBABILITY OF CORRECT PREDICTION | .74 | 0.85 | 1.0 | 0.74 | 0.85 | 1.0 | 0.74 | .99 |
| 5 | PREDICTION ERROR | 0 | 1 | 0 | 0 | 1 | 0 | 1 | 0 |
| 6 | REORDERED PREDICTION ERROR | 0 | 0 | 0 | 0 | 1 | 1 | 0 | 1 |
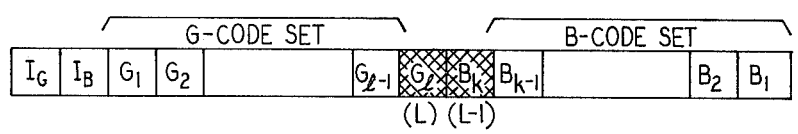
FIG. 4
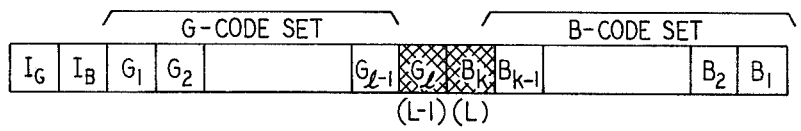
FIG. 5
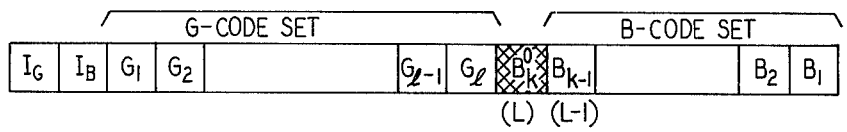
FIG. 6
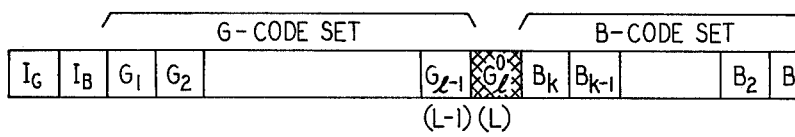
FIG. 7
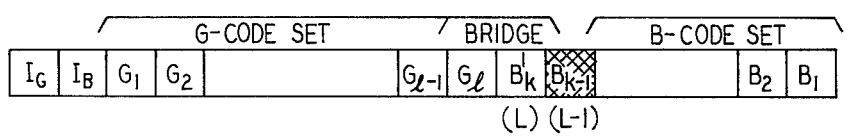
FIG. 8
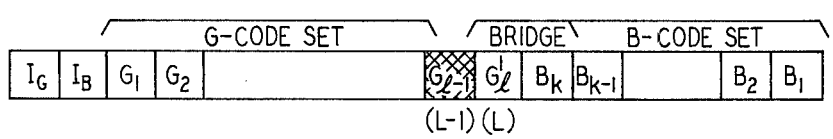
FIG. 9

FUNCTION CONTROL LOGIC

END OF RUN PULSE GENERATOR 1303

DATA PROCESSING LOGIC 1015

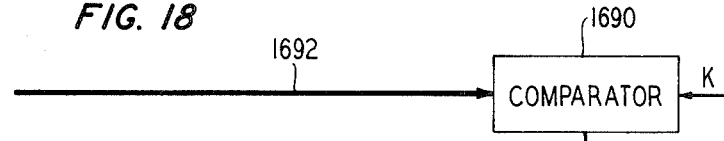
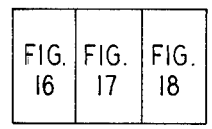
FIG. 18
FIG. 19

RUN LENGTH ENCODING OF FACSIMILE SIGNALS

BACKGROUND OF THE INVENTION (1) Field of the Invention

The present invention pertains generally to encoding of pictorial data and, in particular, to encoding of two level (black and white) facsimile pictures using run length encoding.

(2) Description of the Prior Art

In U.S. Pat. No. 4,060,834 issued to F. W. Mounts and A. N. Netravali on Nov. 29, 1977, a processor for increasing the run length of digital signals is described wherein a signal measure is permuted in response to a reference signal. As applied in the context of facsimile picture encoding, the signal measure is an error signal generated by predicting the intensity value of each element of the picture based upon the intensity values of surrounding picture elements, and by comparing the prediction so generated with the actual intensity value of the picture element. The reference signal, sometimes referred to as a calibration signal, is a measure of the degree of confidence associated with each prediction. Each line of picture data (or data from any other convenient reordering interval) is processed so that if the prediction is considered "good", the error signal is loaded beginning at one end of a memory while, if the prediction is "bad", the error is loaded beginning at the opposite end of the memory. The permuted or reordered error signal, when read sequentially from one end of the memory, then statistically exhibits runs of increased length, since, in the good region, errors should seldom be encountered. Accordingly, the reordered signal can be processed with increased efficiency in a conventional run-length encoder.

While the Mounts et al invention achieves significant improvement in encoding efficiency for facsimile pictures, a further decrease in bit rate is nevertheless possible. Accordingly, the broad object of the present invention is to decrease the amount of data which must be used to represent a two-tone picture without degrading its quality. By so doing, it becomes possible to capitalize on the trend in which the cost of digital circuits and memories is decreasing faster than the cost of transmission facilities. A concomitant object is to make further use of the redundancy contained in most pictures in order to reduce the number of bits per picture element that must be communicated between transmitter and receiver, or that must be stored so as to permit later recovery of the picture.

SUMMARY OF THE INVENTION

The foregoing and additional objects are achieved in accordance with the present invention by further processing of the reordered prediction error data output from an encoder of the type described in the aforementioned Mounts et al patent before run length coding the data and then transmitting the codes to a remote location. Generally speaking, the processing includes assembling the reordered data into a series of runs (each run containing the same error value, and adjacent runs generally containing opposite error values), and analyzing the runs to determine if one or more runs can be dropped (i.e., not transmitted to the receiver) or bridged (i.e., two adjacent runs combined into a single run). The drop/bridge determination is made as a function of the characteristics of the runs themselves and the order in which they are needed at the receiver. Processing in accordance with the invention may further include encoding the length of "good" error value runs with a first code set and the length of runs of "bad" error values with a second code set. Processing is facilitated by adding to each line of run length codes a code indicating the error value of a particular run within each good/bad region, so that the error value of the runs (as well as their length) will be ascertainable at the receiver.

The present invention takes advantage of the redundancy inherent in the reordered error signal, as it relates to the picture signal being processed. In the receiver, the previously decoded line is used in conjunction with the incoming run length codes to decode the latter, and the process is repeated for each subsequent line. The availability of this type of decoding at the receiver enables compression of the data at the transmitter.

Implementation of the processing techniques of the present invention via computer simulation has indicated that entropies in the range of 0.020–0.133 bits/picture element is possible, depending on the nature of the picture being encoded. This represents an 11–21% decrease, as compared to the ordinary techniques of the aforementioned Mounts et al patent used in conjunction with conventional run length coding.

BRIEF DESCRIPTION OF THE DRAWING

The foregoing features and advantages of the present invention will be better appreciated by a consideration of the following detailed description, when read in light of the accompanying drawing in which:

FIG. 1 is a table showing exemplary picture intensity data, together with corresponding reordered prediction error data;

FIGS. 4–9 illustrate different run configurations for reordered error data.

FIGS. 16, 17 and 18 together form a block diagram of a decoder constructed in accordance with the principles of the present invention; and FIG. 19 shows the relationship of FIGS. 16–18.

DETAILED DESCRIPTION

Figure 2:
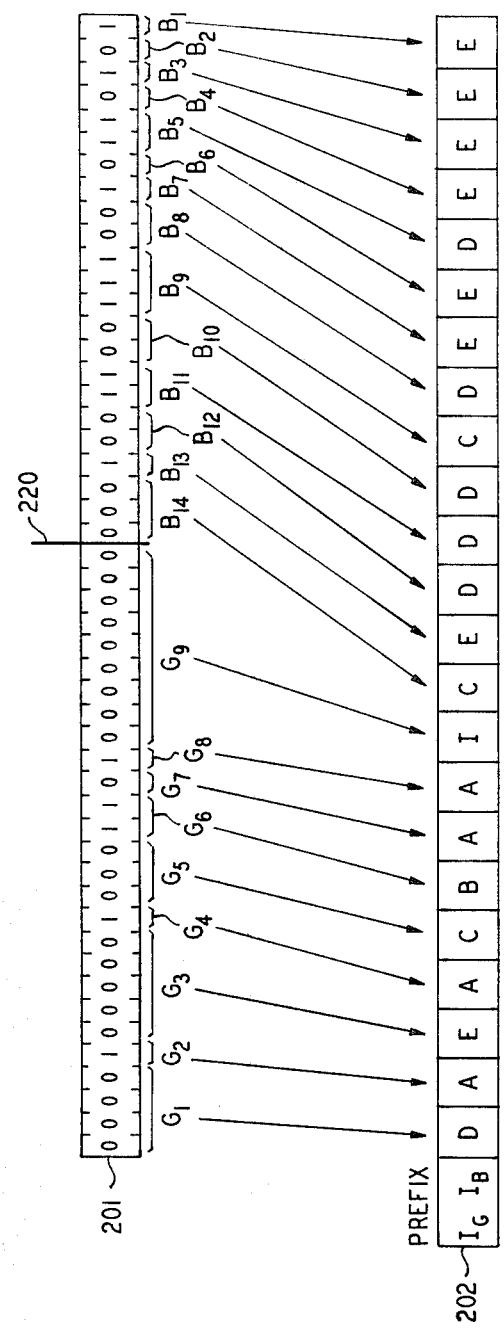
FIG. 2 shows an abbreviated line of reordered prediction error data and one form of run length coding of that data.

Since the present invention is intended for use in conjunction with a reordering system of the type described in U.S. Pat. No. 4,060,834 issued to F. W. Mounts et al on Nov. 29, 1977, pertinent portions thereof will be repeated below for convenience. A complete understanding of that invention can be obtained from a reading of that patent and of a related application Ser. No. 734,387, filed Oct. 21, 1976, entitled Run Length Preprocessor for Compressing Facsimile Data, now U.S. Pat. No. 4,086,620, which is assigned to the same assignee as the present application.

Referring first to FIG. 1, a table showing the interrelationship between exemplary input picture intensity data and corresponding reordered prediction error data is shown, together with certain intermediate information used to generate the latter. The table is similar to the table of FIG. 2 of the aforementioned Mounts et al patent.

In FIG. 1, rows 1 and 2 represent binary data obtained by scanning and digitizing a picture or document to be encoded. The data is in binary form, with a "1" representing a black dot or mark, and a "0" representing a white dot or space. The scanning apparatus used to generate data of this type may be of various kinds familiar to those skilled in the art. A typical line of real picture information may contain 1728 picture elements, with a resolution of about 200 pels/inch for an 8½ inch page width.

As is well known, the information contained in adjacent scan lines is highly correlated, so that good predictions of the intensity value of a particular picture element can be made from the intensity values of surrounding picture elements. In one particular prediction scheme, intensity values of the four pels (1) above and to the left, (2) immediately above, (3) above and to the right, and (4) on the left of the present pel are used in making the prediction, as set forth in FIG. 2 of the Mounts et al U.S. Pat. No. 4,060,834. Thus, as stated in that reference, the predicted intensity value of pel 4 of the current line is a "1", since the surrounding elements (in the order stated above) have intensity values 0-1-1-0, and this four-tuple yields a prediction value "1" on row 6 of the aforesaid FIG. 3. As a second example, the intensity values of the elements surrounding pel 6 of the current line are 1-0-1-0, yielding a predicted intensity value "0" (see row 10). Of course, prediction schemes different from the table of FIG. 3 could also be successfully used.

An important aspect of the prediction technique of the Mounts et al patent is the fact that an estimate of confidence can be associated with each predicted intensity value. This confidence estimate, sometimes called the probability of correct prediction, is derived from a study of the statistics of different pictures, and indicates whether the confidence in each predicted intensity value is low or high. For the predictions of FIG. 3 of the Mounts et al patent, the confidence estimate for each possible prediction is shown in the last column. For the specific predictions of FIG. 1, the confidence estimates for each four-tuple are listed in row 4.

In accordance with the Mounts et al technique, each predicted intensity value in row 3 is compared with the corresponding true intensity value to determine the existence of a prediction error, sometimes simply referred to as an error value. Using the convention that the presence of a prediction error is indicated by a "1" and the absence of an error by a "0", the prediction error values associated with the predictions of row 3 of FIG. 1 are shown in row 5. Electrically, the error signal is generated by applying the true intensity values and the predicted values, on a bit-by-bit (pel-by-pel) basis, to an exclusive OR gate, such as gate 30 of FIG. 1 of the Mounts et al patent. The order in which the error values appear in row 5 thus corresponds exactly to the order in which the picture elements are scanned: the error value for pel 1 is "0", the value for pel 2 is "1", and so on.

Still in accordance with the Mounts et al invention, the N prediction error values for a reordering interval (which is most conveniently set at one scan line of picture data) are reordered in accordance with a good/bad state signal (or reference signal) which is a function of the confidence estimate described above. For example, a confidence estimate above 0.85 may be considered a "good" state, and a confidence estimate equal to or below 0.85 may be considered a "bad" state. Sorting is accomplished by loading the first "good" group into a register or memory having a storage capacity of N elements numbered from 1 to N, beginning at element number 1 and continuing in ascending order. The second "bad" group is loaded into the memory beginning at element number N and continuing in descending order. Thus, for example, if the reordering interval is N=8 and if the memory positions are numbered as in FIG. 1 from 1 to 8 (from beginning to end), the first "good" prediction error is stored in position 1, the second "good" prediction error is stored in position 2, and so on, whereas the first "bad" prediction error is stored in position 8, the second "bad" prediction error is stored in position 7, and so on. The prediction error values of FIG. 1, row 5, are thus reordered as shown in row 6.

After all N prediction error values are reordered as described above, all of the N memory positions will be filled with a first group of positions 1, 2 ... m including error values which originated from high confidence (good) predictions, and with a second group of positions N, N-1, N-2 ... m+1 including error values which originated from low confidence (bad) predictions. The error values in the first (good) group will generally (though not exclusively) be 0's, since these error values originated from predicted values which have a high probability of being correct, and accordingly, the prediction is quite likely to match the corresponding true pel value, yielding a "0" error value. This tendency toward long runs of 0's is, of course, the main objective of the Mounts et al invention, since such long runs lend themselves to efficient run length coding. On the other hand, in the second (bad) group, prediction errors are more likely since the associated predictions have a low confidence level so that both 0's and 1's will occur in a random-like pattern.

Conceptually, the present invention begins with the reordered prediction error data of the type shown in row 6 of FIG. 1, which data would be available at output 80 of FIG. 1 of the Mounts et al patent. Since error data from only a limited number of pels are shown in FIG. 1, another interval of reordered error data, chosen to reflect typical characteristics, is shown in the upper line 201 of FIG. 2, for the purposes of further explanation. This interval includes 50 error values although, as stated previously, an actual embodiment would usually include data from an ordering interval with many more pels.

In line 201 of FIG. 2, a certain number (m) of the 50 error values originated from predictions with high confidence, and these values may be called the good error value group, or simply the good group. The remaining (50-m) error values originated from predictions with low confidence, and these values may be called the bad error value group, or simply the bad group. The dividing line 220 between the good and bad groups is not discernable from a mere inspection of the error data itself; however, with knowledge of the manner in which the underlying predictions were calculated, it will be understood that such a dividing line will exist, except in the event that all predictions are good or bad. For purposes of the present example, this division will be assumed to occur after the 27th error value, so that the good group contains m=27 values and the bad group contains 50−m=23 values.

The object of the present invention, as stated previously, is to encode the lengths of runs in the reordered error data of the type shown in line 201, in an efficient manner, so that the codes may be transmitted to a remote location where the original picture can be reconstructed, or so that the codes can be entered in a storage location for later use. This object is accomplished, in part, by coding the lengths of runs in the good group with a first code set or dictionary, and runs in the bad group with a different code set or dictionary. In this connection, a run is ordinarily defined as an uninterrupted or continuous series of error bits of the same value. Thus, in line 201, the first four "0" bits are a run, the next single "1" bit is a run, the next five bits are a run, and so on. Similarly, still referring to line 201, the last four bits are each runs of length 1, the fifth and sixth from last bits are a run, and so on. From a further inspection of line 201 of FIG. 2, it will be seen that a continuous series of 0's crosses the boundary between the good and bad groups. Under the ordinary definition stated above, this series would be considered as a single run of length 12 bits, thus ignoring the fact that the good/bad group boundary has been traversed. However, in accordance with the present invention, it will be convenient to define a run as an uninterrupted or continuous series of error bits which have the same value (i.e., all 1's or all 0's) and which have the same "state". In this definition, the "state" of an error value is determined from the confidence level in the prediction from which the error value originated; an error value has a good state when the underlying prediction was good (high confidence) or a bad state when the underlying prediction was bad (low confidence). Accordingly, in the example of FIG. 2, the aforesaid series of 12 bits includes two runs, one good run of length 9 extending from pel 19 to pel 27, and one bad run of length 3 extending from pel 28 to pel 30.

The runs of line 201 of FIG. 2, as just defined, may be labeled $G_1, G_2 \ldots G_l$ and $B_1, B_2 \ldots B_k$, following the manner in which the error values were entered into the memory or register represented in FIG. 2. Specifically, $G_1$ is the first good run, starting from the lowest numbered element of the memory, continuing in ascending order, $G_2$ is the second good run, and $G_l$ is the last good run, i.e., the run before the boundary with the bad group. Similarly, $B_1$ is the first bad run, starting from the highest numbered element of the memory, $B_2$ is the second bad run continuing in descending order, and $B_k$ is the last bad run, i.e., the run adjacent to the boundary with the good group. For the example of FIG. 2, the following Table lists the lengths of all of the runs:

TABLE 1

| | | | |
|---|---|---|---|
| $G_1$ | 4 | $B_1$ | 1 |
| $G_2$ | 1 | $B_2$ | 1 |
| $G_3$ | 5 | $B_3$ | 1 |
| $G_4$ | 1 | $B_4$ | 1 |
| $G_5$ | 3 | $B_5$ | 2 |
| $G_6$ | 2 | $B_6$ | 1 |
| $G_7$ | 1 | $B_7$ | 1 |

TABLE 1-continued

| | | | |
|---|---|---|---|
| $G_8$ | 1 | $B_8$ | 2 |
| $G_9$ | 9 | $B_9$ | 3 |
| | | $B_{10}$ | 2 |
| | | $B_{11}$ | 2 |
| | | $B_{12}$ | 2 |
| | | $B_{13}$ | 1 |
| | | $B_{14}$ | 3 |

While the run lengths in the foregoing Table are only exemplary, they do illustrate a characteristic encountered in processing real facsimile signals, namely, that the run lengths in the good group tend, on the average, to be longer than those in the bad group. This difference makes it advantageous to form different code dictionaries for each group, with each code dictionary enabling assignment of shorter code words to more frequently occurring run lengths and longer code words to less frequently occurring run lengths.

The use of different code dictionaries for the runs in the good and bad groups, however, will not usually result in a net improvement in encoding efficiency if an indication of which code dictionary was used must be incorporated within the coded data. Such an indication is not needed in accordance with the present invention. Rather, code words representing the run lengths in the bad group are simply appended to the code words representing the run lengths in the good group, and the entire code series is sent to a remote receiver or storage location in the same order in which the runs are contained in line 201.

When decoding is to be accomplished, the receiver has available run length codes from a complete reordering interval and the prior line of decoded picture intensity data which was recovered by decoding the run length codes for preceeding intervals. From this information, the dictionary from which each code word was encoded is identified, the code words are translated to the corresponding run lengths, and the picture intensity data for the present interval is recovered. The process is then repeated for each succeeding reordering interval.

The foregoing can be illustrated by an example in which the good and bad runs of line 201 are assigned codes from Tables 2 and 3, respectively. In these Tables, which follow, code letters have been assigned to each run length, rather than variable length binary code words, only for the purposes of illustration and ease of explanation.

| TABLE 2 GOOD RUNS | | TABLE 3 BAD RUNS | |
|---|---|---|---|
| RUN LENGTH | CODE | RUN LENGTH | CODE |
| 1 | A | 1 | E |
| 2 | B | 2 | D |
| 3 | C | 3 | C |
| 4 | D | 4 | B |
| 5 | E | 5 | A |
| 6 | F | | |
| 7 | G | | |
| 8 | H | | |
| 9 | I | | |

Returning to FIG. 2, line 202 shows the codes assigned to the runs of reordered error values in line 201. The codes for runs $G_1$–$G_9$ were obtained from Table 2, while the codes for runs $B_1$–$B_{14}$ were obtained from Table 3. The codes in line 202 appear in the same order as the runs of line 201, namely, the first code letter represents the length of the first good run $G_1$, the second code letter represents the length of the second good run, et cetera, while the last code letter represents the length of the first bad run $B_1$, the second from last code letter represents the length of the second bad run $B_2$, and so on.

In addition to the code letters, line 202 includes a pair of prefix codes $I_G$ and $I_B$ which indicate the error value of a particular run in each of the good and bad groups. For example, $I_G$ may be a "0" to indicate that the first good run $G_1$ is made up of 0's and $I_B$ may be a "1" to indicate that the first bad run $B_1$ is made up of 1's. Of course, if the value of any run in a group is known, the values of all other runs in the group are also known, since the values of adjacent runs must alternate.

Figure 3:
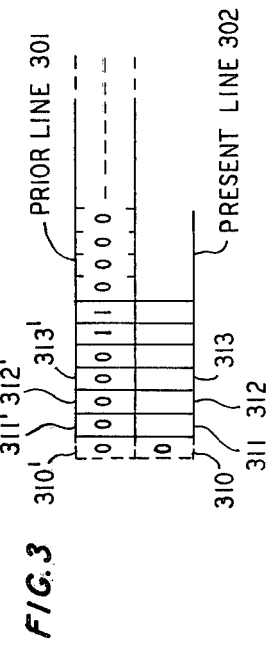
FIG. 3 illustrates a portion of a prior line of decoded picture intensity data that is used in decoding of the present line.

Since the code letters of line 202 are transmitted to a receiver without any indication of the location of the boundary between the good and bad group, nor any indication of which code dictionary was used to code any particular run length, decoding is accomplished by using the code letters in conjunction with previously decoded intensity values. This is illustrated in FIG. 3, which shows an exemplary line 301 of facsimile data which has already been decoded. In this example, a margin of zeroes is assumed to surround the picture, for decoding purposes. Also, a sample value is uniquely associated with each picture element, which elements are numbered 310', 311', 312' . . . in the prior line 301, and 310, 311, 312 . . . in the present line 302, each beginning with the assumed zero margin value.

The intensity value of picture element 311 is determined by examining the values of pels 310', 311', 312' and 310 which surround element 311, which, in this example, is the four-tuple 0-0-0-0. From FIG. 3 of the Mounts et al patent, a predicted intensity value of "0" is indicated, and this same four-tuple indicates a "good" probability of correct prediction, i.e., when the probability of correct prediction exceeds a threshold of 0.85. This indicates to the receiver that the first run length code to be decoded is from the good group, in this example, the code letter D. Using Table 2, this code represents a run of length 4; the value of the error bits in this run, determined from the $I_G$ prefix, is also "0". Accordingly, the predicted intensity value is not in error and the value of pel 311 is "0".

For the next picture element 312, the surrounding pels 311', 312', 313' and 311 yield a four-tuple 0-0-0-0. The predicted value is again "0", and the prediction is again "good", using FIG. 3 of the Mounts et al patent. Since a good run of length 4 has already been decoded, and three of its bits have not yet been used, the next error bit, a 0, is taken to mean that the "0" prediction is correct. Accordingly, the decoded intensity value of pel 312 is "0".

The foregoing decoding procedure continues until the 4 error values in the first decoded run $G_1$ are used up, or until a run of "bad" error values is needed. In the former event, the code A for the second good run $G_2$ is interpreted from Table 2 as a run of length 1; the error value of this run is "1"; since the error values of runs within each group must, by definition, alternate, and the first run had a value "0". As further good runs are needed, they are similarly decoded, using good runs $G_3$, $G_4$ . . . in turn.

By way of comparison, when a "bad" run is needed, the run length code for the first bad run $B_1$ is selected from line 202. Using Table 3, the code E represents a run length 1. The value of this run is a 1, as indicated by the second bit $I_B$ of the prefix mentioned earlier. Thereafter, as subsequent bad runs are needed, they are similarly decoded, using bad runs $B_2$, $B_3$ . . . in turn.

From the above, it is seen that run lengths are decoded as needed, with the state (i.e., good or bad) of the needed run being determined by the previously decoded intensity data for pels surrounding the pel being processed. While a time delay in decoding is necessitated by the fact that run length codes for a complete reordering interval must be received before processing can begin, this disadvantage is more than compensated by the fact that two separate dictionaries may be used for the good and bad run lengths without any need to identify, in the transmitted information, which dictionary was used. Again, it is here to be pointed out that the crude letter code dictionaries of Tables 2 and 3 are for the purpose of illustration only. In an actual embodiment, the letter codes would be replaced by binary variable length codes of the Huffman code type, as explained in D. A. Huffman, "A Method for the Construction of Minimum Redundancy Codes", *Proceedings of I.R.E.*, Vol. 40, September 1952, pp. 1098–1101.

While the above-described technique of encoding the run lengths of reordered prediction error data effects a bit rate savings by use of two code sets or dictionaries for different groups of runs, a further improvement in efficiency can be obtained in furtherance of the objects of the present invention by dropping one or more run length codes, and/or by selectively bridging a pair of adjacent run lengths (of the same or opposite values) to form a combined run length which is coded as a single run. While the bridge/drop procedures are interrelated, it will be convenient to discuss them separately.

With respect to dropping a run length code from transmission, it is to be understood that if a sync code is used to separate data from each reordering interval, one run length code can always be dropped. This is true because each interval includes a predetermined number N of picture elements; if the lengths of all of the runs except the last are counted, the last run's length can be obtained by simple subtraction. However, in the present invention, two run length codes can be dropped, as illustrated as the cross-hatched runs in FIGS. 4 and 5.

In FIG. 4, reordered prediction error data from one interval has been arranged as prefix $I_G$, $I_B$ followed by good runs $G_1$, $G_2$ . . . $G_l$, followed by bad runs $B_k$, $B_{k-1}$ . . . $B_2$, $B_1$. In this figure, run $B_k$ will be designated as the "next to last decodable run" and run $G_l$ will be designated as the "last decodable run" as they are needed by the receiver; the former is denoted by L-1 and the latter by L written below the run number in FIG. 4. The determination of which run is the "last (or next to last) decodable run" is important to the present invention, and should be clearly understood.

First, it will be recalled that the elements in the facsimile picture are scanned and digitized in sequence, and the *un*ordered error bits maintain the same sequence. For example, the N picture elements in a reordering interval can be thought of as having address numbers from 1 to N; these picture elements are scanned sequentially in increasing address order. Second, each error bit corresponds to a particular predicted intensity value that has a confidence value or state which will hereafter be associated with the error value itself. Third, a run is defined as a series of error bits having the same value and the same state. Using the foregoing definitions, the "last decodable run" is defined as the run which begins with the error value associated with the picture element having the largest address; the "next to the last decodable run" is the run which begins with the error value associated with the picture element having the second largest address. The states of the last and next to last decodable runs can be the same or different, although the latter situation is illustrated in FIGS. 4 and 5.

Additional understanding of the definition of the last and next to last decodable runs can be obtained from a general description of the technique used to identify these runs. For each reordering interval, a first signal $\phi_{SGR}$ is generated to mark the beginning of each good run, and a second signal $\phi_{SBR}$ is generated to mark the beginning of each bad run. These signals are generated by comparing, for a given state, the value of each error bit with the value of the preceeding error bit to detect a change or transition. At the occurrence of either of the $\phi_{SGR}$ or $\phi_{SBR}$ signals, the state (i.e., good or bad) of the error value then being processed is stored in a 2-bit shift register, the contents of which are continually updated for the remaining data in the reordering interval. At the end of the interval, the two bits stored in the register represent the states of the last and next to last decodable runs in that interval.

Returning to FIG. 4, in the case where the states of the last and next to last decodable runs are different, both runs are dropped in accordance with the present invention, and the lengths of only the remaining runs are coded and transmitted. At the receiver it is necessary to determine, for each of the dropped runs L-1 and L, its length and its value. During decoding, the run length codes corresponding to runs prior to L-1 are decoded in the order that they are needed, as previously explained. After the L-2$^{th}$ run has been decoded, the receiver will "need" the the L-1$^{th}$ run, but will find no code word for a run length present. At this point, the receiver will assume that the length of the L-1$^{th}$ run is the difference between the number N of pels in a complete interval minus the total number of pels in the already decoded run lengths. The error value of the L-1$^{th}$ run is opposite to that of the previous run of the same good or bad state, and the state of the L-1$^{th}$ run is determined from the previously decoded intensity values for neighboring pels. When the surrounding pels dictate that an error value of the state opposite to the state of the L-1 run is required, the difference between the number of pels in a complete interval minus the total number of pels in the already decoded run lengths is again computed. This time, the computation yields the answer zero, since it was previously assumed that the length of the L-1$^{th}$ run was the same as the difference now being computed; however, the zero answer will be treated in the receiver as an indication that the remaining error values of the required state will have a value opposite to the value of error bits in the previous run of the same state. At this point, the remaining picture elements in the reordering interval are decodable, and decoding is stopped when all pels in the interval have been reconstructed.

In FIG. 5, run $B_k$ is the last decodable run and $G_l$ is the next to last decodable run. The procedure followed is identical to that described above: both runs are dropped and yet are capable of being reconstructed at the receiver.

A different situation exists when the last and next to last decodable runs have the same state, i.e., both are good or both are bad. In these cases, a single run may be dropped, and the lengths of another pair of runs may be bridged or combined, but only if it is advantageous, in the bit saving sense, to do so. Specifically, in the case where the last decodable run has a value of "0", that run is dropped, and no bridging occurs. This is done since runs of "0" are generally longer than runs of "1", so that maximum efficiency can be achieved. The foregoing is illustrated in FIG. 6 in which the L$^{th}$ run has a "bad" state and in FIG. 7 in which the L$^{th}$ run has a "good" state. Decoding in these instances is accomplished as noted above, i.e., when the missing run is needed, its state is determined from the neighboring decoded data, its length is determined by subtracting the total number of pels in the previously decoded run lengths from N, and its value is determined to be opposite to the value of the previous run of the same state. In the case where the L$^{th}$ run has a value 1, the L-1$^{th}$ run is dropped, and the length of the L$^{th}$ run is bridged to or combined with the preceding run of the *opposite* state. This is illustrated in FIG. 8, where the L-1$^{th}$ run is $B_{k-1}$ and the L$^{th}$ run is $B_k$, which has a value 1; there the run length code for $B_{k-1}$ is dropped, and the length of $B_k$ is combined with the length of $G_l$ (the preceding run of the opposite state), which combined run length is encoded using the good code dictionary. Decoding is accomplished in an ordinary manner until the bridged run $G_lB_k$ is reached. Initially, this run is treated as a good run, since the receiver has no way of determining that bridging has occurred. When the text bad run ($B_{k-1}$) is needed, its length will be determined by subtracting the total number of pels in the previously decoded run lengths from N; the value of the bad run will be opposite to that of the preceding bad run. Decoding of pels continues until all of the bits represented by the $B_{k-1}$ run are used up, and yet another bad state error value is needed. At this point, the above subtraction yields a zero answer, which, as before, directs the receiver to simply change the value of the previous bad run and to continue decoding until the end of the reordering interval. In this fashion, the entire interval is decoded in the receiver without prior knowledge of the individual lengths of runs $B_{k-1}$, $B_k$ and $G_l$.

A similar situation is illustrated in FIG. 9, where $G_l$ is the last decodable run, $G_{l-1}$ is the next to last decodable run, and the value of $G_l$ is 1. Here again, $G_{l-1}$ is dropped, and the length of $B_k$ is encoded as including the length of $G_l$. At the receiver the $B_k$ run is initially interpreted as having a length equal to $B_k$ plus $G_l$, since the receiver has no way of determining that bridging has occurred. When the good run ($G_{l-1}$) is needed, its length will be determined by subtracting the total number of pels in the previously decoded run lengths from N; the value of the good run will be opposite to that of the preceding good run. Decoding of pels continues until all of the bits represented by the $G_{l-1}$ run are used up and yet another good state error value is needed. At this point, the above subtraction yields a zero answer, which, as before, directs the receiver to simply change the value of the previous good run and to continue decoding until the end of the reordering interval. In this fashion, the entire interval is decoded in the receiver without prior knowledge of the individual lengths of runs $G_{l-1}$, $G_l$ and $B_k$.

Although not illustrated, if a reordering interval contains only good runs or only bad runs, the last run ($G_l$ or $B_k$, respectively) is dropped.

Figure 10:
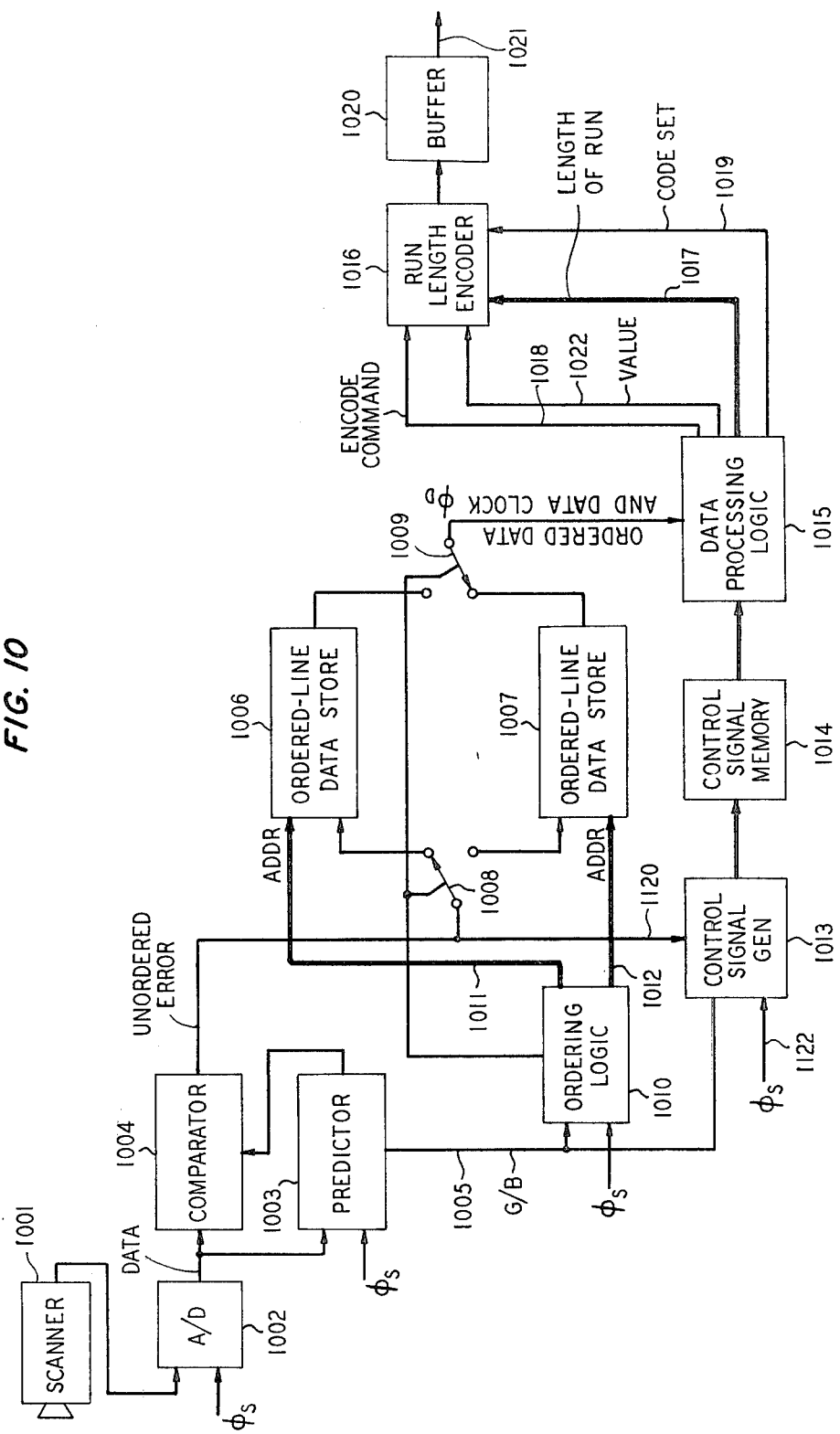
FIG. 10 is an overall block diagram of apparatus for encoding reordered prediction error data in accordance with the principles of the present invention.

Having thus described the basic principles of the present invention, its implementation will now be explained by reference to FIGS. 10 to 15. In FIG. 10, a picture to be encoded is scanned by a conventional scanner or camera 1001, the output of which is sampled and digitized by an analog/digital converter 1002 at a clock rate $\phi_S$. The pel intensity data output from converter 1002 is applied to a predictor 1003 and to one input of a comparator 1004, the other input of which receives the predicted value of each pel intensity sample. Predictor 1003 may be a random access memory arranged in any well known manner to compute predictions of the type shown in FIG. 3 of the aforecited Mounts patent, based upon the intensity values of pels surrounding the pel being processed. A second output from predictor 1003 on line 1005 is a reference or state signal which indicates whether each prediction is "good" or "bad" this signal, labeled G/B, can be obtained simply by programming a read-only memory so that each four-tuple in FIG. 3 of the Mounts patent has an associated binary state value, e.g., a "1" for a good state and an "0" or a bad state.

The output of comparator 1004 is the unordered prediction error signal described above, which has a "0" value for no error and a "1" value for an error. Assuming that the reordering interval includes all of the picture elements on one complete scan line, the output of comparator 1004 is applied to either ordered line data store 1006 or a similar ordered line store 1007. The capacity of each store must be sufficient to store the N reordered error value of one interval. Input and output of data from the store is controlled by a pair of data selectors, shown as switches 1008 and 1009, which are arranged so that data is written into one store as it is being read out of the other store. The positions of switches 1008 and 1009 are controlled in unison by an output from ordering logic 1010. Logic 1010 receives the G/B state value from predictor 1003, and provides address information to stores 1006 and 1007 on lines 1011 and 1012, respectively, such that, for the line being written, "good" prediction error values are stored beginning at the lowest numbered memory position and continuing in increasing order, while "bad" prediction error values are written beginning at the highest numbered memory position and continuing in decreasing order. Lines 1011 and 1012 are heavy to indicate multi-bit capacity. The apparatus described thus far simply performs the prediction error ordering function described in the aforementioned Mounts patent in a manner essentially the same as that used in FIG. 1 of that patent. For example, stores 1006 and 1007 correspond to memory circuits 55 and 65 shown in FIG. 1 of the Mounts patent, while ordering logic 1010 is generally arranged to perform the functions of write address generator 300 and read address generator 400 of that patent. Predictor 1003 combines the functions of predictor 15 and reference signal generator 20 of the Mounts patent, while comparator 1004 is equivalent in function to Mounts' exclusive OR gate 30. Finally, the switching function of switches 1008 and 1009 is performed by Mounts' control logic 200 in conjunction with OR gates 51 and 61 and selector 70.

Continuing with a description of FIG. 10, the unordered prediction error data output from comparator 1004 is applied to a control signal generator 1013 together with the G/B state output of predictor 1003. Generator 1013, to be described in detail hereinafter, analyzes the data to generate control signals which determine whether runs are to be dropped and/or bridged. Since control signals for one reordering interval of data are processed while the data from the preceding interval is being read out from store 1006 or 1007, a control signal memory 1014 is provided to store the output of generator 1013 for one reordering interval. Control signals are written into memory 1014 when a strobe signal $\phi_{EL}$ is generated at the end of each reordering interval.

The output of memory 1014 and the appropriate output from stores 1006 or 1007 are applied to data processing logic 1015 described in detail hereinafter, which is arranged to control the drop/bridge operations performed on the ordered data. A clock signal $\phi_D$ (not shown) accompanies the data read out from stores 1006 and 1007. The outputs of logic 1015 provide a run length encoder 1016 with the value to be encoded on line 1022, the length of run data on line 1017, with an encode command on line 1018, and with a code set signal on line 1019 which indicates which code dictionary is to be used. The output of encoder 1016 is coupled to a transmission line 1021 via a data buffer 1020.

Figure 11:
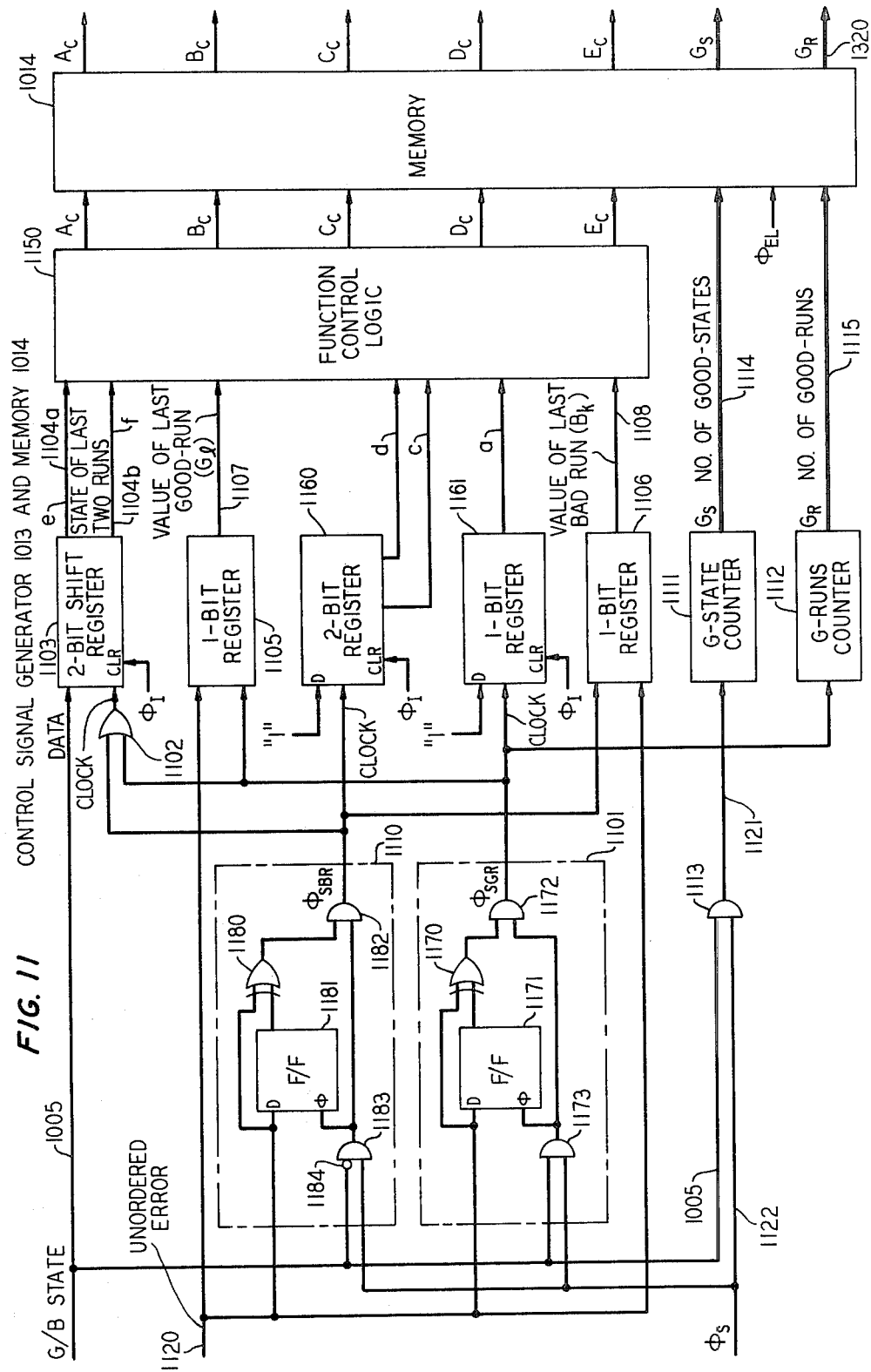
FIG. 11 is a block diagram of control signal generator 1013 and memory 1014 of FIG. 10.

Details of the control signal generator 1013 and memory 1014 are shown in FIG. 11. This circuit includes detectors 1101 and 1110 which detect the beginning of good and bad runs, respectively, by monitoring the incoming unordered data from comparator 1004 on line 1120 to detect transitions of a given state. Detector 1101 includes an AND gate 1173 which receives $\phi_S$ timing pulses from line 1122 and the G/B state signal from line 1005. When the G/B state signal is high, indicating a good state, AND gate 1173 passes a $\phi_S$ clock pulse to the clock input of flip-flop 1171. This serves to store the unordered error value on line 1120 in the flip-flop.

The output of flip-flop 1171 and the next unordered error value on line 1120 are compared in an exclusive OR gate 1170, the output of which is applied to one input of a second AND gate 1172. If a transition is detected by gate 1170, gate 1172 is then enabled to pass clock pulses from AND gate 1173. Thus, the desired timing pulse $\phi_{SGR}$ is formed at the beginning of each run of good error values.

In similar fashion, detector 1110 includes a flip-flop 1181, as well as gates 1180, 1182, and 1183. However, an inverter 1184 is disposed in line 105, so that a $\phi_{SBR}$ output is produced only for bad error value transitions (i.e., when the G/B signal is zero).

The outputs of detectors 101 and 1110 are both applied to the clock input of a 2-bit shift register 1103 via an OR gate 1102, while the G/B state signal is coupled to the data input of that register. At the end of each reordering interval of picture information, register 1103 will thus contain a two-bit word indicative of the *states* of the last two decodable runs in the reordering interval. This word is extended to function control logic 1150 on lines 1004a and 1004b. In later descriptions of function control logic 1150, the signal on line 1104a will be referred to as the "e" signal, which is a "1" if the state of the last decodable run is good, and "0" if the state of that run is bad. The signal on line 1104b will be referred to as the "f" signal, which is a "1" if the state of the next-to-last decodable run is good, and a "0" if the state of that run is bad.

A pair of one-bit registers 1105 and 1106 are provided in the control signal generator of FIG. 11 in order to store the *values* of the last good run ($G_j$) and the last bad run ($B_k$), respectively. Register 1105 receives a clock input from the $\phi_{SGR}$ output of detector 1101 and a data input from line 1120, while register 1106 receives a clock input from the $\phi_{SBR}$ output of detector 1110 and the same data input. At the end of each interval of picture data, registers 1105 and 1106 contain the desired values, which are extended to function control logic 1150 on lines 1107 and 1108, respectively.

Signal generator 1013 also includes a pair of registers 1160 and 1161 which are needed to resolve any ambiguity that may arise due to the fact that register 1103 is reset at the beginning of each reordering interval (by a $\phi_I$ pulse) and that some reordering intervals may contain fewer than two runs. Register 1160 has a two-bit capacity, providing two output signals "c" and "d" to logic 1150. This register is cleared by a $\phi_I$ pulse, and each subsequent occurrence of $\phi_{SBR}$ shifts a "1" into the register. Accordingly, for no bad runs, c=d=0; for one bad run, c=1 and d=0; and for two or more bad runs, c=d=1. Register 1161 has a one-bit capacity and provides an output signal "a" to logic 1150. This register is also cleared by $\phi_I$, and any subsequent occurrence of $\phi_{SGR}$ produces a high output (a=1).

As will be described hereinafter, it is advantageous to have available the number $G_S$ of error values with good states, and the total number $G_R$ of good runs that occur in each reordering interval. As to the former, AND gate 1113 passes the $\phi_S$ timing pulse on line 1122 to a counter 1111 at each occurrence of a good state signal on line 1121. Since the "good" state is represented by a "1", the count in counter 1111 represents the total number of good error values in the reordering interval; $G_S$ is extended directly to memory 1014 on line 1114. With respect to good runs, another counter 1112 is arranged to receive and count the output of detector 1101; the $G_R$ output is extended directly to memory 1014 on line 1115.

Figure 12:
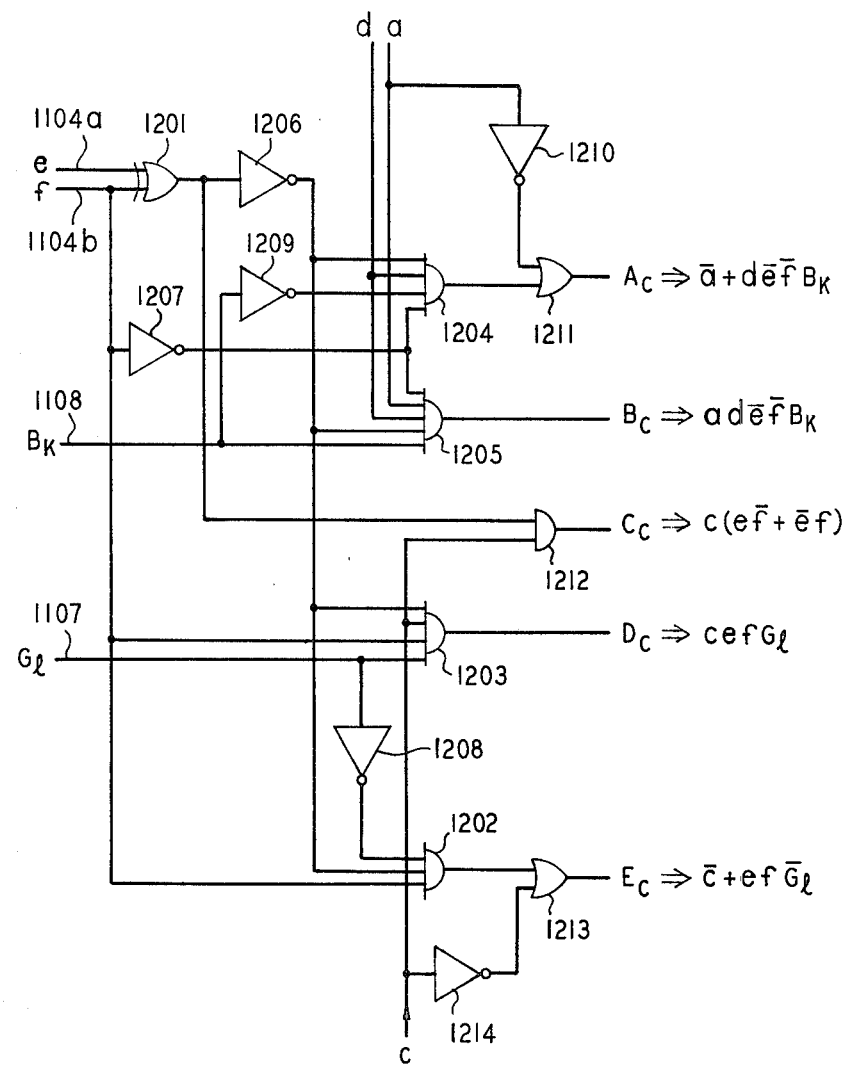
FIG. 12 is a logic diagram of function control logic 1150 of FIG. 11.

Function control logic 1150 of FIG. 11 is shown in detail in FIG. 12. Briefly, this logic is arranged to generate signals which control the drop/bridge decision in the run length coder; five separate control signals $A_c$-$E_c$ are provided in the logic, one for each possible decision. Specifically, the situation of FIGS. 4 and 5 wherein both $G_l$ and $B_k$ are dropped is represented by control signal $C_c$. The situations (FIGS. 6 and 7) where $B_k$ or $G_l$ only is dropped are represented by control signals $A_c$ and $E_c$, respectively. The same control signals also indicate instances in which only bad or only good runs exist within a reordering interval, respectively. For the situation depicted in FIG. 8, i.e., drop $B_{k-1}$ and bridge $B_k$ and $G_l$, the control signal is $B_c$. Finally, for the case where $G_{l-1}$ is dropped and $G_l$ is bridged to $B_k$ (FIG. 9) the control signal is $D_c$.

In FIG. 12, the a, c, d, e and f signals described above, as well as the $G_l$ and $B_k$ values, are applied to a series of logic elements 1201-1214 which are arranged to generate the control signals $A_c$-$E_c$ according to the following logic combinations:

$A_c = \bar{a} + d\,\bar{e}\,\bar{f}\,Bk$
$B_c = a\,d\,\bar{e}\,\bar{f}\,Bk$
$C_c = c(\bar{e}f + \bar{e}f)$
$D_c = cefGl$
$E_c = \bar{c} + ef\overline{Gl}$ Of course, other logic arrangements could be used to provide the same result with equal success.

As explained previously, the control signals generated by logic 1150 are stored in memory 1014 for one reordering interval, since as each interval of picture data is being processed, the previous interval is being read out from one of the data stores 1006 or 1007. Even though the outputs of memory 1014 will thus be delayed versions of the corresponding inputs, the same designations ($A_c$-$E_c$) will be used for convenience in the following explanation.

Figure 13:
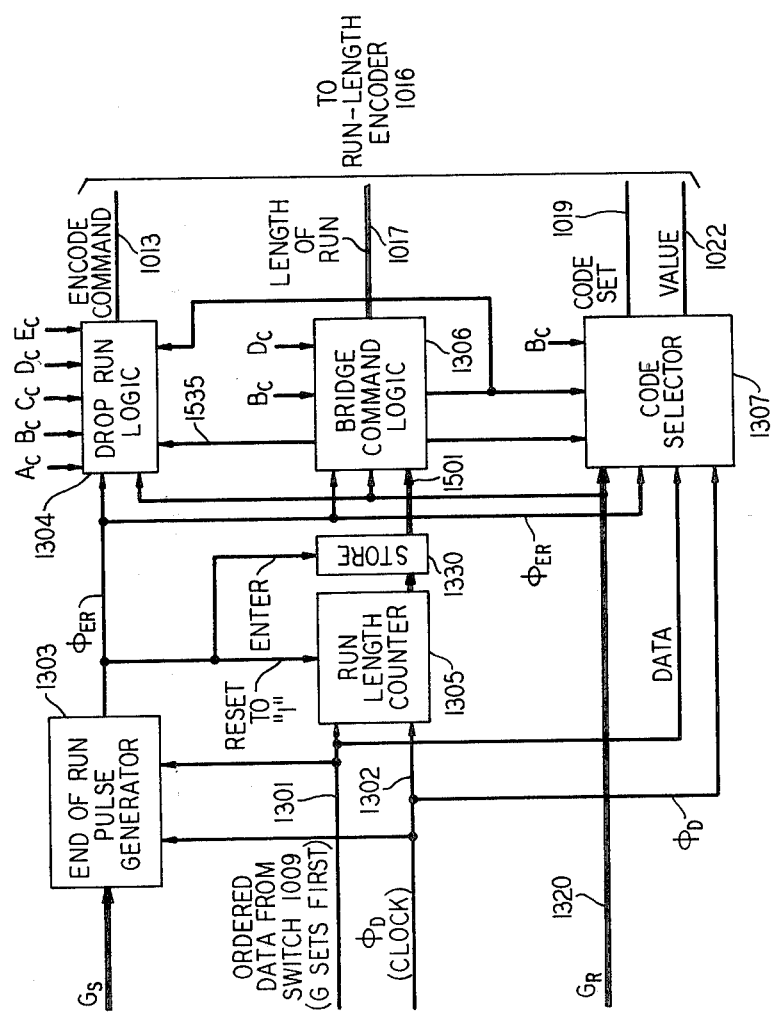
FIG. 13 is a block diagram of data processing logic 1015 of FIG. 10.

Referring now to FIG. 13, the data processing logic 1015 of FIG. 10 is arranged to receive the $A_c$-$E_c$ outputs from memory 1014 that correspond to the ordered error data being read out from either store 1006 or 1007, and the $G_S$ and $G_R$ signals generated by counters 1111 and 1112, respectively. The error data provided to logic 1015 on line 1301 is read out with the good data first ($G_1$, $G_2$... $G_l$) followed by the bad data ($B_k$, $B_{k-1}$, $B_{k-2}$... $B_1$); a corresponding data clock signal $\phi_D$ is provided to logic 1015 on line 1302. Logic 1015 includes an end of run pulse generator 1303 which is arranged to produce $\phi_{ER}$ pulses at the end of each run of ordered data. These pulses are applied to drop run logic 1304 which in turn passes encode commands on line 1018 to run length encoder 1016 at the end of each run *except* when a run is to be bridged or dropped.

The input ordered error data and data clock signals are applied also to a run length counter 1305 which is reset to a count of one by a $\phi_{ER}$ pulse from generator 1303. At the same time, the count in counter 1305 is entered in a store 1330 until the next $\phi_{ER}$ pulse. This store provides the delay necessary to synchronize the run length information with the control signals generated in bridge command logic 1306. The output of store 1330 is coupled via line 1501 to a bridge command logic circuit 1306. The latter extends a length of run signal on line 1017 to run length coder 1016; this signal is the same as the run length counted by counter 1305, except when a run is to be bridged, as will be explained below.

The logic of FIG. 13 further includes a code selector 1307 which compares the number of good runs $G_R$ with the number of runs already processed, in order to provide run length coder 1016 with a signal on line 1019 indicating which code dictionary or code set to use. The error value (1 or 0) of the ordered data being processed is also input to selector 1307 and then appropriately delayed and extended to coder 1016 on line 1022.

Figure 14:
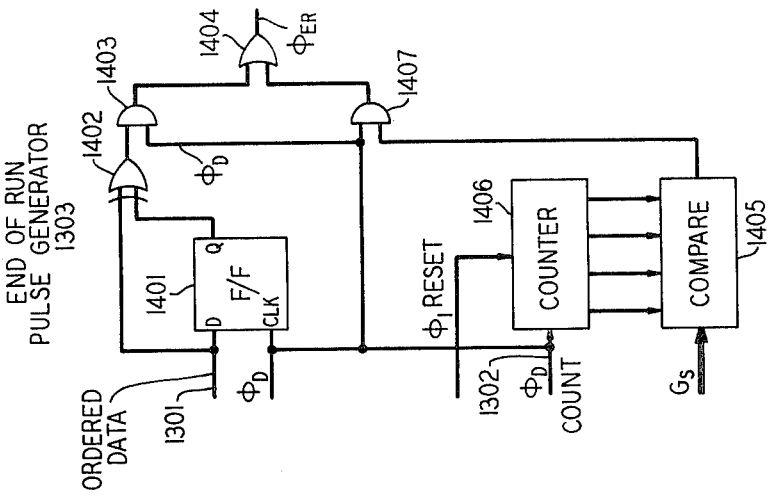
FIG. 14 is a logic diagram of end of run pulse generator 1303 of FIG. 13.

End of run pulse generator 1303 may be configured as shown in FIG. 14. The incoming ordered data from line 1301 is applied to a flip-flop 1401 which provides a one sample delay. The flip-flop output and the ordered data are compared in an exclusive OR gate 1402, the output of which is high when the inputs are different, indicating that a run is ending. The output of gate 1402, when high, enables AND gate 1403 to pass the next data clock pulse $\phi_D$, which is then coupled through OR gate 1404 to the $\phi_{ER}$ output.

Since a run also ends when the good/bad boundary is crossed even if the error values on either side of the boundary are the same, generator 1303 also includes a comparator 1405 which compares the number $G_S$ with the number of data clock pulses $\phi_D$ counted in a counter 1406. When the comparator inputs are equal, the aforesaid boundary has been reached; a high output from comparator 1405 enables AND gate 1407 to pass the next $\phi_D$ clock pulse, which is then passed through OR gate 1404 to the $\phi_{ER}$ output. Counter 1406 is reset to a count of zero at the beginning of each interval of data by an initialization pulse $\phi_I$, generated by apparatus not shown.

Figure 15:
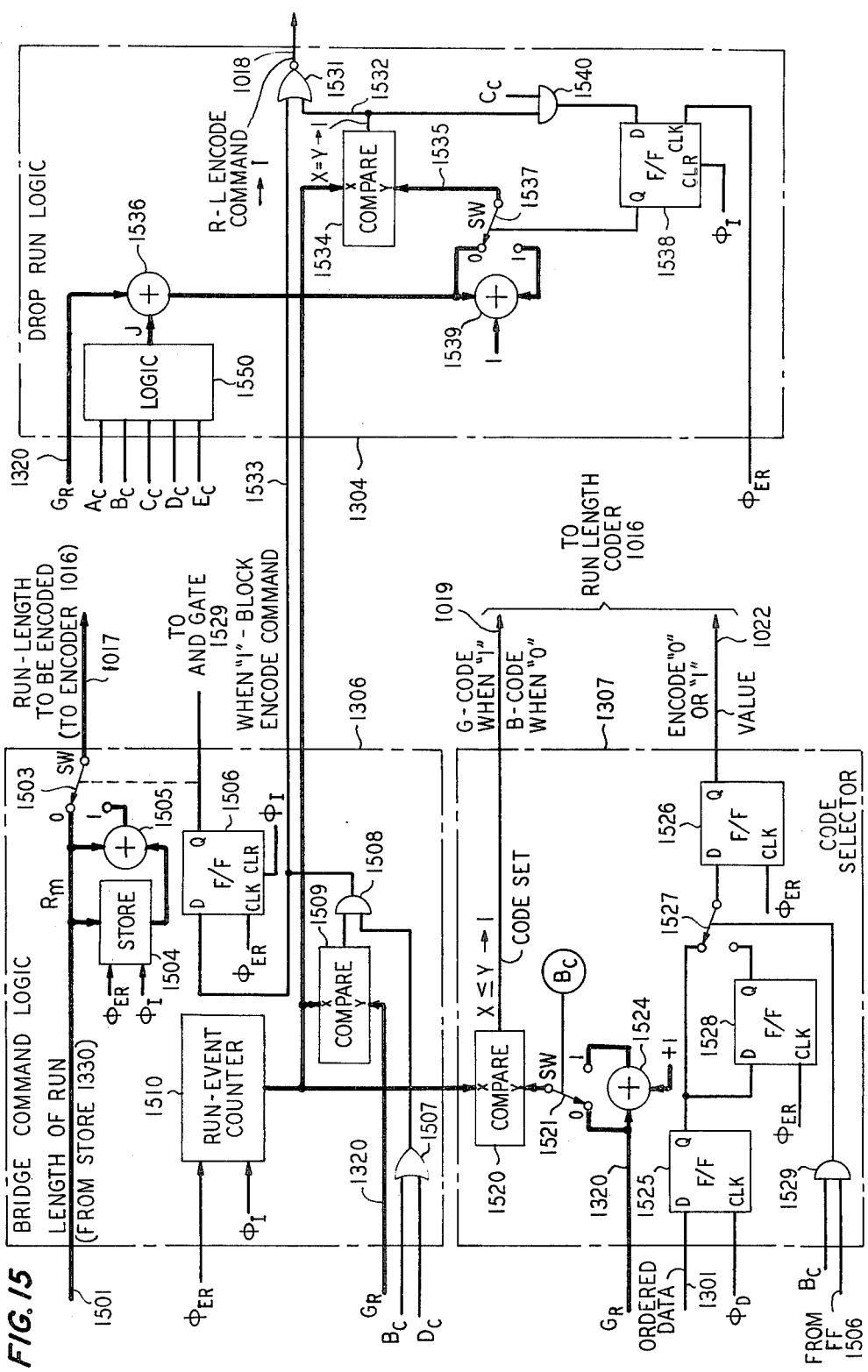
FIG. 15 is a block diagram of drop run logic 1304, bridge command logic 1306 and code selector 1307 of FIG. 13.

Details of the bridge command logic 1306, the code selector 1307 and the drop run logic 1304 of FIG. 13 are shown in FIG. 15.

Bridge command logic 1306 receives length of run information on line 1501 from the output of store 1330 and normally applies it to encoder 1016 on output lead 1017 via a data selector, shown as switch 1503, positioned as shown. The length of each run is also entered in a register or store 1504 at the occurrence of each end of run pulse $\phi_{ER}$, so that when the contents of the store are added to the present run length in an adder 1505, the adder output represents a bridged run, i.e., a combination of the length of the present and previous runs. The output of adder 1505 is coupled to line 1917 when switch 1503 is in its other position. This occurs when the output from a flip-flop 1506 is high. Like other switches shown in this specification, data selector 1503 is a readily available logic element which selects either of two data inputs, depending on the state of a control signal, which is shown as a dashed line.

The remaining circuitry in bridge command logic 1306 determines when the output of flip-flop 1506 is high, thereby to effect the desired bridging. Referring to the previous discussion of control signals $A_c$–$E_c$, it will be recalled that runs are bridged only in the situations shown in FIG. 8 and 9, when control signals $B_c$ and $D_c$ are high. When either of these signals is high, the output of OR gate 1507, which is coupled to one input of AND gate 1508, will be high. Since bridging actually occurs at the end of the last good run, a comparator is arranged to compare $G_R$ (the number of good runs counted by counter 1112) with the number of runs counted by a run event counter 1510, which is advanced by $\phi_{ER}$ pulses. When the output of comparator 1509 goes high, the other input to AND gate 1508 is enabled, and a high input is applied to flip-flop 1506, producing a high output at the next $\phi_{ER}$ pulse. The high output from AND gate 1508 is also applied to a NOR gate 1531 via line 1533, and the low output of the NOR gate blocks encoding in run length encoder 1016. This assures that the length of the first run of the bridged pair is not encoded, but is combined with the length of the second run of the pair. Flip-flop 1506, counter 1510 and store 1504 are all appropriately initialized by application of a $\phi_I$ pulse to each.

Code selector 1307 of FIG. 13 includes a comparator 1520 which compares the number of good runs $G_R$ on line 1320 with the count in counter 1510, as long as a switch 1521 remains in the position shown in FIG. 15. If the value of $G_R$ is greater than or equal to the count in counter 1510, then the boundary between the good and bad regions has not yet been reached. In this case, the output of comparator 1520 on line 1019 is high, telling run length coder 1016 to use the "good" code dictionary. Conversely, once the good/bad boundary has been reached, the output of comparator 1520 goes low, telling code 1016 to use the "bad" code dictionary.

Code selector 1307 must also provide encoder 1016 with the appropriate value (1 or 0) of the run for which a length is being encoded, and this value must be synchronized with the length of run data output on line 1017. To accomplish this, ordered data on line 1301 is clocked into a flip-flop 1525 at each occurrence of $\phi_D$, yielding a delay of one bit interval. With switch 1527 in the position shown, the output of flip-flop 1525 is applied to a second flip-flop 1526, which receives its clock input from the $\phi_{ER}$ output of generator 1303; this provides an additional delay of one run interval and, as stated previously, synchronizes the value output on line 1022 with the length of run on line 1017.

The only exception to the foregoing occurs in the situation depicted in FIG. 8 wherein the good code dictionary is used to encode the bridged $G_lB_k$ run, which run ends on the run which is immediately after the good/bad boundary. In this situation, control signal $B_c$ is high, moving switch 1521 to its other position. This adds the value 1 to the value of $G_R$ in an adder 1524, and thereby serves to continue use of the good code dictionary for the additional run, as is desired.

Also, in this situation ($B_c$ is high), the output from an AND gate 1529 becomes high when the output of flip-flop 1506 is high. This repositions switch 1527, so that yet another flip-flop 1528 is inserted in the path between flip-flop 1525 and 1526. This adds yet another delay of one run interval to insure that the value of the first run of the bridged pair is extended to run length coder 1016 on line 1022.

Drop run logic 1304 operates to inhibit run length coder 1016 from encoding the length of any run or runs which are to be dropped. Recalling the previous explanation of FIGS. 4–9, one run is dropped in all cases except those of FIGS. 4 and 5, in which two runs are dropped. In the latter instances, control signal $C_c$ is high.

Briefly, logic 1304 operates by applying a high input to NOR gate 1531 on line 1532; the output of gate 1531 is connected on line 1018 to the encode command input of coder 1016 so that when this input is made low, the coder will not encode the run, effecting the desired dropping. A second input to NOR gate 1531 on line 1533 is supplied by the output of AND gate 1508. This input effects dropping during the bridging operation described previously, i.e., when $G_lB_k$ is bridged, run $G_l$ is effectively being dropped from encoding.

The input to NOR gate 1531 on line 1532 is supplied by the output of a comparator 1534 which is arranged to compare the count in counter 1510 with a value applied on line 1535, and to generate a high output only when the compared values are equal. The value on line 1535 is supplied, in most instances, by the output from an adder 1536 which adds to the value $G_R$ an integer J. This integer value is computed in a logic circuit 1550, and is determined by the values of control signals $A_c$–$E_c$, in accordance with the following Table:

Table 4

| |
|---|
| If $A_c = 1$, J $= +1$ |
| If $B_c = 1$, J $= +2$ |
| If $C_c = 1$, J $= 0$ |
| If $D_c = 1$, J $= -1$ |
| If $E_c = 1$, J $= 0$ |

Several examples will illustrate the foregoing.

In the situation of FIG. 6, (when signal $A_c$ is high) the run to be dropped ends one run after the $G_R$ good runs have ended. Accordingly, with J=1, $G_R=1$ is applied to comparator 1534 on line 1535 (assuming switch 1537 is in the position shown in FIG. 15) and the $B_k$ run is appropriately dropped.

In the situation of FIG. 7 (when signal $E_c$ is high) the run to be dropped is the last good run $G_l$. Accordingly, with J=0, $G_R$ is applied to comparator 1534 on line 1535, and the output of NOR gate 1531 goes low at the end of the $G_l$ run.

Inspection of FIGS. 8 and 9 (when the control signals are $B_c$ and $D_c$, respectively) reveals that similar results are achieved by making J= +2 and −1, respectively.

When the situations of FIGS. 4 or 5 occur, and signal C is high, two runs are to be dropped. This is accomplished with the use of flip-flop 1538 and adder 1539. Specifically, the first run ($G_l$) is dropped as before, since J=0 for $C_c=1$. However, the high output of comparator 1534 together with the high $C_c$ signal cause AND gate 1540 to set flip-flop 1538, transferring switch 1537 to the position opposite to that shown. In that position, adder 1539 adds 1 to the value of $G_R$, and applies the new value to the line 1535 input to comparator 1534. This results, as explained previously, in dropping the second run, $B_m$. Flip-flop 1538 is timed by the $\phi_{ER}$ pulses output from generator 1303 and reset by $\phi_I$.

One example of a variable length Huffman code which may be used in encoder 1016 is given below, for the purpose of illustration:

TABLE 5

| Run Length | Code Word | |
|---|---|---|
| | Header | Data |
| 1-2 | 0 | X |
| 3-6 | 10 | XX |
| 7-22 | 110 | XXXX |
| 23-278 | 1110 | XXXXXXXX |
| 279-1302 | 11110 | XXXXXXXXXX |
| 1303-1728 | 111110 | XXXXXXXXX |
| Sync Code | 111111 | |

In this code, a sync word of width $K=6$ separates data from each recording interval, and is followed by a series of run length code words which each include a header followed by a series of one or more data bits X. Each header is uniquely recognizable, and indicates, in accordance with a predefined scheme, how many data bits follow. In the present example, the header 0 indicates that a single data bit follows; the header 10 indicates that two data bits follow; the header 110 indicates that four data bits follow; and so on, as shown in the Table. In this example, runs of length 1 and 2 are represented by a code of length 2, namely, 00 for a run of length 1 and 01 for a run of length 2. Runs of length 3-6 are represented by a code of length 4, as follows:

1000=3
1001=4
1010=5
1011=6

Similarly, runs of length 7-22 are represented by a code of length 7 as follows:

1100000=7
1100001=8
1100010=9
1100011=10

.
.
.

1101111=22

In each implementation of the present invention, the statistics of the run lengths to be encoded are used to determine the assignment of the code words, in terms of the number of data bits and/or header bits per code word. In the preceding example, the shortest code lengths represent the smallest run lengths, although this need not always be the case. Indeed, as stated previously, it is advantageous to assign the shortest code words to the run lengths that occur most frequently.

Figure 16:
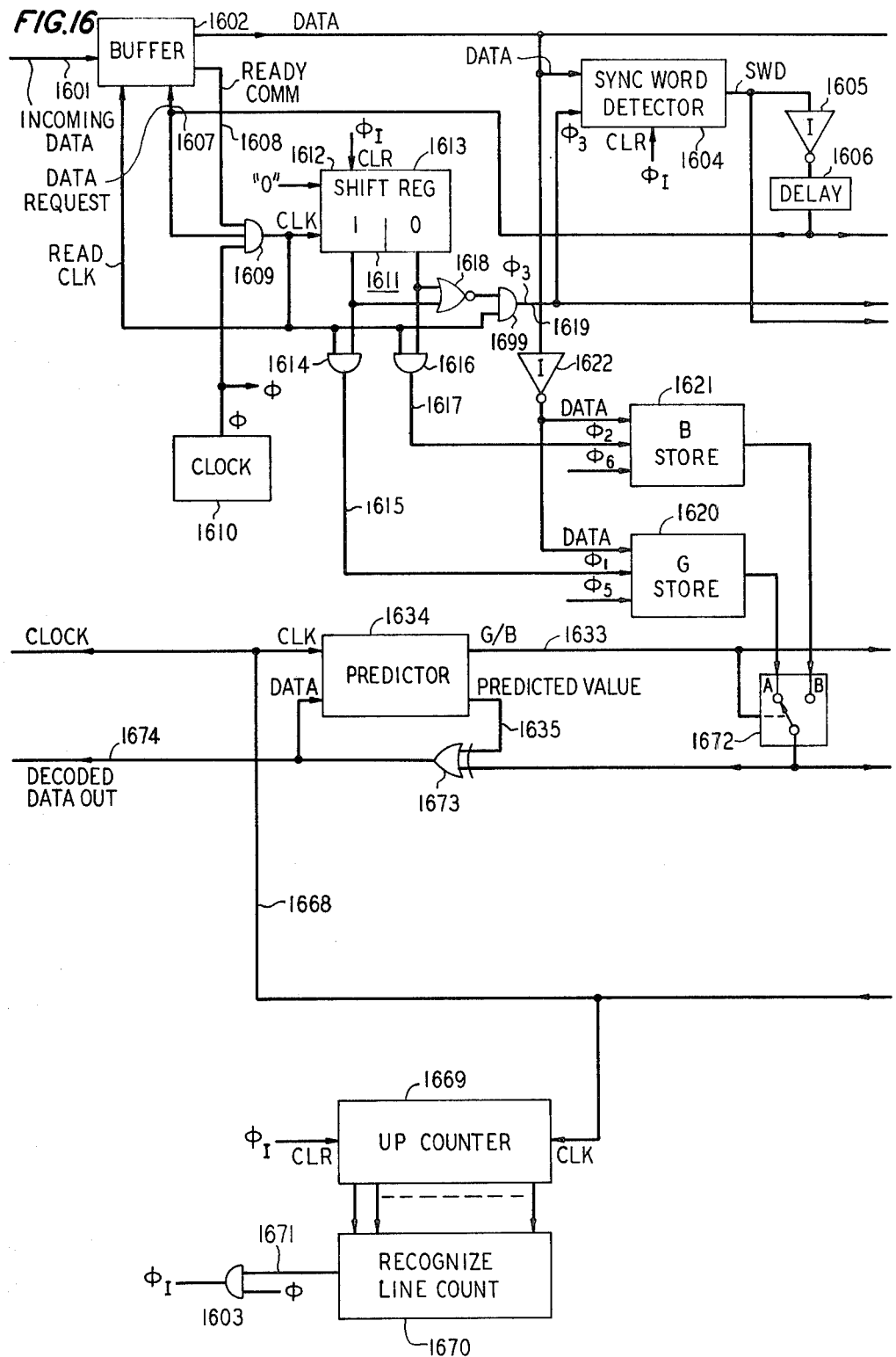
Figure 17:
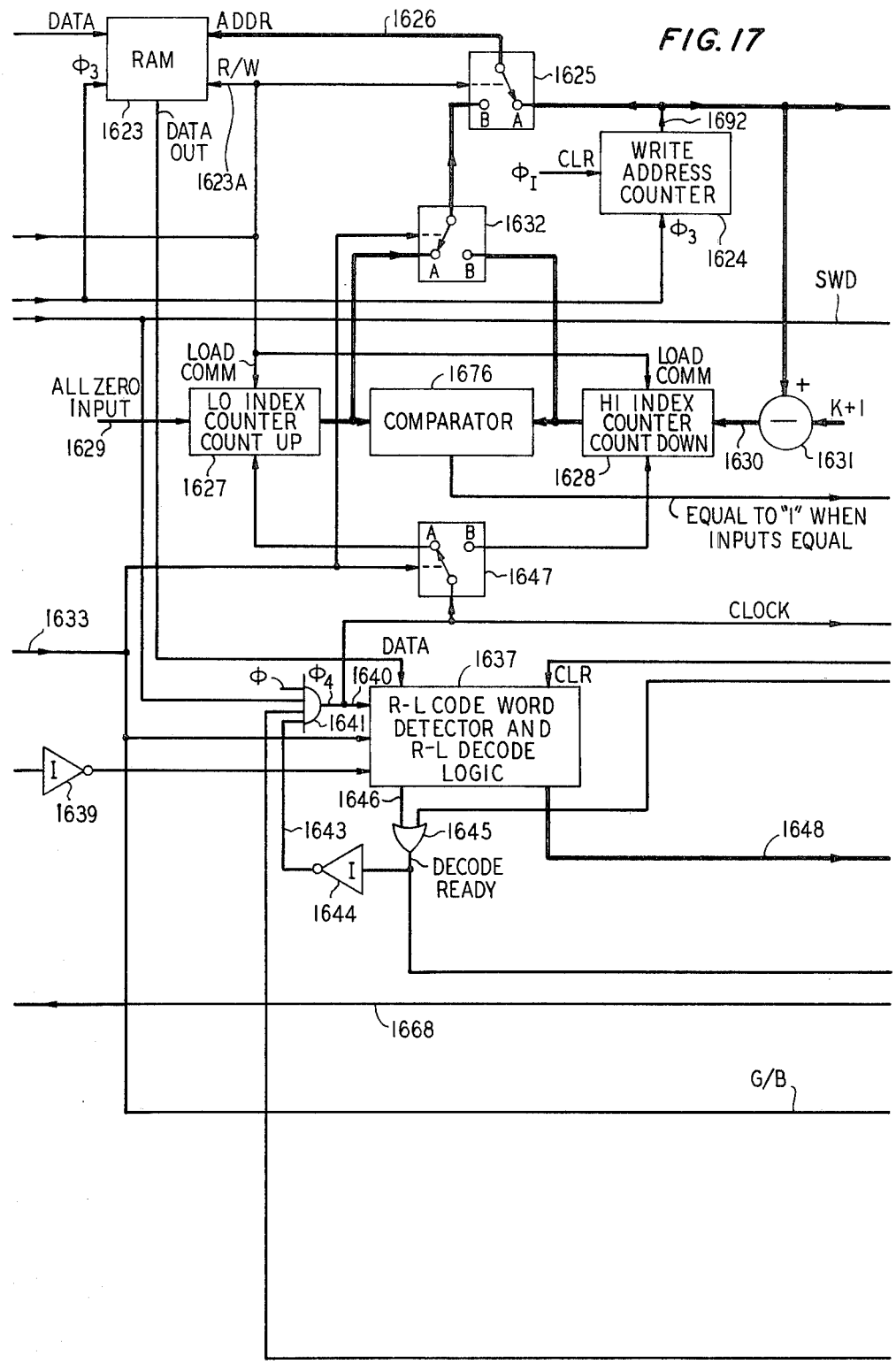

Once the run lengths have been encoded in accordance with the present invention, decoding is accomplished in a basically two-step process that utilizes data from one reordering interval at a time: first, the run length codes are decoded to yield the lengths of runs of good and bad error values, as they are needed. Second, the error values are used, in conjunction with the previously decoded intensity values of neighboring picture elements, to determine the intensity value of the presently processed picture element. When all run length codes have been decoded, and further error values are needed, the dropped and/or bridged runs are determined as explained previously. One arrangement for a decoder in accordance with the present invention is shown in FIGS. 16, 17 and 18. In these FIGS., lines carrying more than one bit in parallel are indicated boldly compared to single bit lines.

In FIGS. 16-18, incoming run length code words and an accompanying clock signal are received on line 1601 and entered into a buffer 1602 which has capacity to store codes from at least one reordering interval. The codes for different intervals are separated by the unique K-bit sync word which, as mentioned above, must be recognizable in the decoder. The individual run length code words are arranged so that code words in the good group are readable in the order in which they are received (i.e., from front to back) while code words in the bad group are readable in reverse order (i.e., from back to front). The code words for each interval are preceeded by a two-bit prefix, explained previously, which indicates the value (1 or 0) of the first run in each (good/bad) group.

Initially, the circuits of FIGS. 16-18 are reset by a $\phi_I$ pulse generated at the output of AND gate 1603. This serves to clear a sync word detector 1604, the output of which is inverted in inverter 1605 and applied to delay circuit 1606. The output from delay circuit 1606 is coupled to the DATA REQUEST input 1607 of buffer 1602, indicating that data is needed.

When data for a complete interval can be read out from buffer 1602, its READY lead 1608 is made high, so that two of the three inputs to AND gate 1609 are then high. In this condition, clock pulses designated $\phi$ can be passed from clock 1610 through gate 1609 to a two-bit shift register 1611, which was preset by $\phi_I$ to store a "1" in its first stage 1612 and a "0" in its second stage 1613. The output of the first stage 1612 enables AND gate 1614 to pass the clock pulse $\phi$ generated at the output of AND gate 1609, producing a $\phi_1$ timing pulse on line 1615 and shifting the contents of register 1611 so that stage 1612 contains a "0" and stage 1613 contains a "1". At the next occurrence of a clock pulse $\phi$, the output of second stage 1613 enables AND gate 1616 to pass the clock pulse, producing a $\phi_2$ timing pulse on line 1617 and again shifting the contents of register 1611 so that both stages contain 0's. Thereafter, the output of NOR gate 1618 will remain high, so that $\phi_3$ timing pulses are output from AND gate 1699 on line 1619 at every occurrence of an output pulse from AND gate 1609.

The $\phi_1$ pulse on line 1615 is used to strobe the first prefix bit $I_G$ from buffer 1602 into a first store 1620; the value of $I_G$ is, however, inverted in inverter 1622, for purposes to be described hereinafter. Similarly, the $\phi_2$ pulse on line 1617 is used to strobe the second prefix bit $I_B$ from buffer 1602 into a second store 1621; again, the value is inverted. All other clock pulses $\phi_3$ are used to clock data from buffer 1602 into detector 1604 and concurrently into a RAM 1623, and to advance the count of a write address counter 1624.

RAM 1623 is maintained in its write cycle by extending the high output from delay circuit 1606 to its read/write control terminal 1623A. During the write cycle, the $\phi_3$ pulses serve to advance the count in a write address counter 1624, which count is applied to the address input 1626 of RAM 1623 via switch 1625 which is positioned as shown. The high output from delay circuit 1606 also enables the load command inputs of low index counter 1627 and high index counter 1628. Counter 1627 is continuously held to the all zero state by entering a zero count on input line 1629. Counter 1628 receives on its input line 1630 the output from a subtractor 1631 which forms the difference between the count in counter 1624 and the quantity k+1, where k is the number of bits in the sync word that separates one line of data from the next. This is done so that the sync word is disregarded when information is later read from RAM 1623.

When run length codes for a complete reordering interval are entered in RAM 1623, a sync word is detected by detector 1604, and its output becomes high, so that the output from delay circuit 1606 goes low. This accomplishes several functions: (1) the data request input 1607 to buffer 1602 becomes low, (2) AND gate 1609 is disabled, terminating the $\phi_3$ timing pulses, (3) RAM 1623 is transferred from its write to its read mode via a change in value on input 1623A, (4) switch 1625 is repositioned to the position opposite to that shown, and (5) the load command to counters 1627 and 1628 is removed. The delay circuit 1606 is timed so that counter 1628 receives the output from counter 1624 (via subtractor 1631) before its load command is removed. Sync word detector 1604 maintains its high output until it is cleared by a $\phi_1$ pulse when the next reordering interval of data is processed.

The coded run length information for a given interval is now stored in RAM 1623, and is decoded as it is needed. The address that is read is determined by the position of a switch 1632. In the position shown in FIG. 17, switch 1632 couples the count in LO index counter 1627 to address line 1626 via switch 1625; when switch 1632 is repositioned, it instead couples the output of HI index counter 1628 to address line 1626. The position of switch 1632 is controlled by the G/B state output on line 1633 that is generated by predictor 1634, such that when a good run length is needed, an address from counter 1627 is supplied to RAM 1623, while when a bad run length is needed, an address from counter 1628 is supplied. Predictor 1634, like predictor 1003 of FIG. 10, may include a RAM adapted to provide predictions on line 1635 in accordance with the four-tuple pattern of FIG. 3 of the Mounts et al patent, and to provide the G/B state signal in the same way as in the encoder of FIG. 10.

From the foregoing, it will be seen that good run length codes are read from RAM 1623 beginning at the all zero address output from counter 1627, which address is increased as counter 1627 counts up. On the other hand, the beginning address for run lengths from the bad group begin at the count in counter 1624 less k+1, which address is decreased as counter 1628 counts down. Decoding continues by reading out good run length codes from left to right, and bad run lengths from right to left; the run length coder 1016 of FIG. 10 inserts the codes in this order as they are generated during encoding.

The run length codes output from RAM 1623 on line 1636 are applied to a run length code word detector 1637, which is arranged to decode each received code word into its appropriate run length value, as, for example, in accordance with Table 4. Detector 1637 receives the G/B state signal on line 1633 from predictor 1634, so that the received code words can be interpreted using the appropriate code set. Detector 1637 also receives the error values stored in stores 1620 and 1621 via switch 1672 and inverter 1639.

Run length codes are clocked into detector 1637 by a clock signal $\phi_4$, which is applied on line 1640 from the output of an AND gate 1641. Inputs to AND gate 1641 are the clock signal $\phi$, the output from sync word detector 1604, a run length data request signal on line 1642, and a lockout signal on line 1643. The output from detector 1604 is applied to AND gate 1641 so that decoding cannot occur in detector 1637 while run length codes are being written in RAM 1623. The lockout signal is high when an output from detector 1637 on line 1646 is low, indicating that the detector is in a clear condition, or that a complete run length code word has not yet been detected. The low on line 1646 reaches line 1643 via OR gate 1645 and inverter 1644. The second input to OR gate 1645 is normally low while data is being read from RAM 1623.

Each time the $\phi_4$ output of AND gate 1641 on line 1640 goes high, the count in either counter 1627 or counter 1628 is changed, depending upon the position of switch 1647, which is controlled by the G/B state signal on line 1633. If the state is good, the count in counter 1627 is increased, and if the state is bad, the count in counter 1628 is decreased, as explained previously. This operation continues as a run length code word is read from RAM 1623 and entered in detector 1637.

Once a complete run length code word has been detected by detector 1637, the output on line 1646 goes high, rendering the lockout signal on line 1643 low and blocking further $\phi_4$ clock signals from gate 1641.

The run length decoded by detector 1637 is output on line 1648 and applied to one side of switch 1649. When this switch is positioned as shown, the decoded run length is applied to the load inputs of first and second run length counters 1650 and 1651, respectively, and to an accumulator which consists of an adder 1652 and a store 1653. This accumulator keeps a running count of the decoded run length total, which is updated each time a new run length is strobed into either counter 1650 or 1651.

The decoded run length output from detector 1637 is entered in counter 1650 is its load command input 1654 is high, or is entered in counter 1651 if its load command input 1655 is high. Which of these inputs is high depends upon two conditions: first, each counter has an associated zero word detector 1656, 1657, respectively, which produces a high output when the count in the associated counter is all zeroes. Second, the appropriate prediction state (good or bad) must be present on line 1633. For example, when pedictor 1634 declares a good state (high on line 1633), and counter 1650 (which is the "good" counter) is empty, the high output from detector 1656 and the high G/B state signal produces a high ouput from AND gate 1658. This in turn enables AND gate 1659 to pass the next $\phi$ clock pulse, which serves to enter the run length into counter 1650. On the other hand, when a bad state is declared (low on line 1633), and counter 1651 (which is the "bad" counter) is empty, the high output from detector 1657 and the high output from inverter 1660 will enable AND gate 1661 to produce a high output. This in turn enables AND gate 1662 to pass the next $\phi$ clock pulse, which serves to enter the run length into counter 1651. AND gates 1659 and 1662 cannot be enabled unless the output from OR gate 1645 is high, indicating that a run length code word has been detected and decoded.

When either counter 1650 or 1651 is being loaded, the clock input thereto is inhibited. For counter 1650, this occurs when inverter 1663 presents a low input to AND gate 1664, the output of which is coupled to that counter's clock input; for counter 1651, a similar inhibiting occurs when inverter 1665 presents a low input to AND gate 1666. When one counter is being loaded, the other counter's clock input is also low, since the G/B state signal for only one counter can be high at any time. Thus, when the outputs of both AND gates 1664 and 1666 are low, no clock pulses are applied to OR gate 1667, so that there is no clock input to prediction logic 1634 on line 1668. This assures that the logic will remain in the same state until a new run length is decoded and entered into one of the counters 1650 or 1651, causing the output of one of the zero detectors 1656 or 1657 to again go low.

It is to be noted that when either of the counters 1650 or 1651 needs to be loaded, the high outputs of either AND gate 1658 or 1661 will produce a high output from OR gate 1668, providing the data request signal on line 1642 that partially enables AND gate 1641 to signal detector 1637 to decode the next run length.

Once a counter 1650 or 1651 has been updated by entry of a new run length, $\phi$ clock pulses applied via gates 1664 and 1666, respectively, are passed through OR gate 1667 to predictor 1634, to generate the next needed G/B state. Also, the count in counters 1650 or 1651 is decremented by one each time a clock pulse is passed through gate 1664 or gate 1666. The output from OR gate 1667 is also used to increase the count in a counter 1669, the output of which is connected to a comparator 1670 which produces a high output on line 1671 when all N picture elements in a reordering interval have been reconstructed.

Each time a load command is applied to counter 1650 on line 1654, the same signal, designated $\phi_5$, is used to toggle the value stored in the good-store 1620. Similarly, each time a load command is applied to counter 1651 on line 1655, the same signal, designated $\phi_6$, is used to toggle the value stored in the bad-store 1621. By this action, the error value of each new run is known since, as stated previously, adjacent runs alternate in value. The appropriate value (good or bad) is selected by a switch 1672, the position of which is controlled by the G/B state signal on line 1633, and applied to the second input of exclusive OR gate 1673. The latter compares the predicted value on line 1635 with the error value from switch 1672 to yield the intensity value for the pel presently being processed. This output is provided on line 1674, and is also fed back to predictor 1634 for use as a neighborhood value in formation of succeeding predictions. A clock signal for the ouptut intensity values is derived from the output of OR gate 1667.

The operation described above continues until all run length codes stored in RAM 1623 have been decoded. At the time the last bit of information is read from the RAM the counts in both counters 1627 and 1628 will be equal, producing a high output from comparator 1676, which is applied to one input of AND gate 1677. Provided the output from detector 1604 is high, this allows the last $\phi_4$ clock pulse to set a flip-flop 1678. When the decoded run length is thereafter entered into counter 1650 or 1651 via a high load signal on line 1654 or 1655, a clock output from OR gate 1679 causes the output of flip-flop 1678 to set a second flip-flop 1680. The high output of this flip-flop passes through OR gates 1681 and 1645, is inverted by inverter 1644 and disables AND gate 1641. Flip-flops 1678 and 1680 remain set until cleared by a $\phi_I$ pulse at the end of the reordering interval.

The high output from OR gate 1645 allows AND gates 1659 and 1662 to pass $\phi$ clock pulses if there is a request for run length information. Hereafter, however, the high output from OR gate 1681 repositions switch 1649, so that further run lengths come from the output of a switch 1682 and not from detector 1637. At this point, the decoder of FIGS. 16–18 are ready to continue decoding even though all of the run lengths have been "used up".

The first time a new run length is needed, switch 1682 is in the position shown, so that the output of subtractor 1683 is loaded into counter 1650 or 1651. The ouput of subtractor 1683 is the difference between the total number of pels in a reordering interval, which is provided on input 1684, and the decoded run length total output from store 1653. At the same time that this number is entered into a counter (1650 or 1651), it is also added to the present contents of store 1653 via adder 1652. Thus, the output of subtractor 1683 becomes zero, and this is detected by zero detector 1685, which generates a high output to reposition switch 1682 for the next run length, if needed. Note also that the output of detector 1685 blocks AND gate 1686 (via inverter 1683) from receiving further clock inputs out of OR gate 1679.

Now, if another request for a run length occurs, as would happen when two run length codes were dropped, the value applied to counters 1650 or 1651 via switch 1682 will be a maximum value (all ones) since this value is constantly applied on line 1688. Decoding of the last run continues until counter 1669 reaches the number of pels in the line, whereupon $\phi_I$ is output from AND gate 1603, resetting all stages to their initial conditions. Data from the next interval may then be processed in similar fashion.

In the event that a reordering interval contains only a single run (which run may be dropped), the encoder will generate a pair of K bit sync codes which are not separated by any run length code. This condition is detected when both inputs to an AND gate 1693 are high: one input is supplied from the output of sync word detector 1604. The other input is provided by the output of a comparator 1690, which goes high when the output of counter 1624 on line 1692 equals the integer K. When AND gate 1693 produces a high output, AND gate 1641 is blocked, so that detector 1637 is rendered inoperative. Switch 1649 is repositioned so that counters 1650 and 1651 are supplied with a run length from subtractor 1683, which in this case contains the number N of pels per reordering interval.

Various modifications of the technique heretofore described will be apparent to those skilled in the art. For this reason, it is intended that the present invention be limited only by the following claims.

We claim:

1. Apparatus for encoding a facsimile signal each sample of which represents the intensity value of a corresponding element of a picture, including
   means for forming a prediction of the intensity value of each of said samples;
   means for forming an error signal which comprises a plurality of error values, each indicating whether a respective one of said predicted intensity values differs from its corresponding true intensity value; and
   means for sorting error values corresponding to N picture elements within a predetermined reordering interval into first and second groups in accordance with the confidence in each of said predicted intensity values;
   characterized by:

means for encoding run lengths in said first group with a first code set and run lengths in said second group with a second code set.

2. The invention defined in claim 1 wherein N is the number of picture elements on a complete scan line of said picture.

3. The invention defined in claim 1 wherein the confidence in a particular predicted intensity value is determined by the intensity values of picture elements in the neighborhood of the picture element to which said particular predicted intensity value corresponds.

4. The invention defined in claim 1 wherein the intensity values of picture elements which surround a given picture element are used to form both the predicted intensity value for that given element and to determine the confidence in said predicted intensity value.

5. The invention defined in claim 4 wherein said error signal forming means includes an exclusive OR gate adapted to compare each of said intensity values with the predicted value thereof.

6. The invention defined in claim 2 wherein said apparatus includes storage means having memory locations numbered from 1 to N, and wherein said sorting means is arranged to write said first group of error values into locations 1, 2 ... m and to write said second group of error values into locations N, N-1, N-2 ... m+1.

7. The invention defined in claim 1 wherein said first and second code sets include different Huffman type codes having characteristics matched to the run length statistics expected in said first and second groups.

8. The invention defined in claim 1 further including means for determining if either of said groups includes both the last and next-to-last runs required in decoding of said error values; and means responsive to said last mentioned means operative to inhibit said run length encoding means from encoding the length of at least one of said runs.

9. Apparatus for encoding a facsimile signal each sample of which represents the intensity value of a corresponding element of a picture, including means for generating an intensity value prediction for each picture element;

means for generating, with respect to each prediction, an error value indicating whether the predicted and true intensity values are equal, and a reference value indicating whether the confidence in said prediction is high or low;

means for reordering error values corresponding to N picture elements which comprise a reordering interval so that high confidence error values are assembled in a first group and low confidence error values are assembled in a second group, wherein each of said groups includes at least one run of prediction errors of the same value, and wherein alternate runs in each group have opposite values; and means responsive to the reference value of first and second particular runs formed by said reordering means for assigning a run length code to only selected ones of the runs in said first and second groups.

10. The invention defined in claim 9 wherein the error values corresponding to the picture elements in said reordering interval are consecutively numbered from 1 to N before reordering;

said apparatus includes a memory having storage locations numbered from 1 to N;

said reordering means is arranged to store high confidence error values in locations 1, 2 ... m and low confidence error values in locations N, N-1 ... m+1; and said first and second particular runs are the runs which begin with the highest and second-highest numbered error values, respectively.

11. The invention defined in claim 10 wherein said run length assigning means is arranged to select neither of said particular runs if said reference values of said particular runs are different.

12. The invention defined in claim 10 wherein said run length assigning means is arranged to select only one of said particular runs if said reference values of said particular runs are the same.

13. The invention defined in claim 11 or 12 wherein said intensity value prediction means is responsive to the intensity values of picture elements in the neighborhood of the picture element for which an intensity value is predicted.

14. The invention defined in claim 13 wherein said reference value generating means is reponsive to the intensity values of said neighboring picture elements.

15. The invention defined in claim 10 wherein said run length code assigning means is arranged to use a first code set for run lengths in said first group and a second code set for run lengths in said second group.

16. The invention defined in claim 15 wherein said apparatus further includes means for appending a prefix code to each series of run length codes to indicate the respective error values of a specified run in each of said groups.

17. Apparatus for encoding a facsimile signal each sample of which represents the intensity value of a corresponding element of a picture, including means for generating an intensity value prediction for each picture element, based upon the intensity values of neighboring picture elements;

means for generating, with respect to each prediction, an error value indicating whether the predicted and true intensity values are equal, and a state value indicating whether the confidence in said prediction is high or low;

means for reordering error values corresponding to N picture elements which comprise a reordering interval so that high confidence error values are assembled in a first group and low confidence error values are assembled in a second group, each of said groups including at least one run of prediction errors of the same value, and alternate runs in each group having opposite values;

characterized by:

means operative in response to the state value and error value of particular ones of said runs for combining the lengths of two of said particular runs; and means for assigning a run length code to selected ones of the runs in said first and second groups, including said combined run.

18. The invention defined in claim 17 wherein (a) said picture elements in said reordering interval have address numbers from 1 to N, (b) said intensity values are generated by sequentially scanning said picture elements in increasing address order, (c) said reordering means includes a memory having N memory locations 1, 2, 3 ... N, (d) prediction error values for said first group are entered in locations 1, 2, 3 ... m, and (e) prediction error values for said second group are entered in locations N, N-1, N-2 ... m+1.

19. The invention defined in claim 18 wherein said particular runs are the runs which begin with the error values associated with the picture elements having the largest and second-largest addresses.

20. The invention defined in claim 17 wherein said run length code assigning means is arranged to use a first code dictionary for run lengths in said first group, and a different code dictionary for remaining run lengths.

21. Apparatus for encoding a facsimile signal each sample of which represents the intensity value of a corresponding element of a picture, including
means for generating an error signal including a plurality of error values each indicating whether a respective one of said intensity values is the same as a predicted version thereof;
means for sorting ones of said error values corresponding to picture elements lying within a particular reordering interval in said picture into first and second groups in accordance with a binary state signal which indicates the confidence in each of said predicted versions; and
means jointly responsive to said error signal generating means and said state signal for coding the run lengths of only selected runs in said first and second groups.

22. The invention defined in claim 21 wherein (a) said reordering interval includes picture elements numbered sequentially from 1 to N; (b) said sorting means includes a memory having storage locations numbered from 1 to N; (c) error values having a first binary state are written sequentially into locations 1, 2 . . . m, and (d) error values having the opposite state are written sequentially into locations N, N-1 . . . m+1.

23. The invention defined in claim 22 wherein said apparatus further includes means for generating control signals indicative of the state of first and second particular runs of error values in said memory,
said first particular run being the run beginning with the error value corresponding to the highest numbered picture element and said second particular run being the run beginning with the error value corresponding to the second highest numbered picture element.

24. The invention defined in claim 23 wherein said selected runs exclude both said first and second particular runs if the states of said runs are different.

25. The invention defined in claim 23 wherein said selected runs exclude said first particular run if the states of said first and second particular runs are the same and each error value of said first particular run indicates that the corresponding intensity value and predicted value are the same.

26. The invention defined in claim 21 wherein said coding means is arranged to code run lengths in said first group with a first code set and run lengths from said second group with a second code set.

27. A method of encoding a facsimile signal each sample of which represents the intensity value of a corresponding element of a picture, including the steps of
generating an intensity value prediction for each picture element;
generating, with respect to each prediction, an error value indicating whether the predicted and true intensity values are equal, and a reference value indicating whether the confidence in said prediction is high or low;
reordering error values corresponding to N picture elements which comprise a reordering interval so that high confidence error values are assembled in a first group and low confidence error values are assembled in a second group, wherein each of said groups includes at least one run of prediction errors of the same value, and wherein alternate runs in each group have opposite values; and
assigning a run length code to only selected ones of the runs in said first and second groups, in response to the reference value of first and second particular runs formed by said reordering means.

28. The method defined in claim 27 wherein the error values corresponding to the picture elements in said reordering interval are consecutively numbered from 1 to N before reordering; and
said reordering step includes storing said error values in a memory having storage locations numbered from 1 to N such that high confidence error values are stored in locations 1, 2 . . . m and low confidence error values are stored in locations N, N-1 . . . m+1.

29. The method defined in claim 28 wherein said first and second particular runs are the runs which begin with the highest and second-highest numbered error values, respectively, and said assigning step includes selecting neither of said particular runs in said reference values of said particular runs are different.

30. The method defined in claim 29 wherein said assigning step further includes selecting only one of said particular runs if said reference values of said particular runs are the same.

31. The method defined in claim 27 wherein said assigning step includes coding run lengths in said first group using a first code set and coding run lengths in said second group using a second code set.

* * * * *